United States Patent
Epstein (10) Patent No.: US 10,311,369 B2
(45) Date of Patent: Jun. 4, 2019

(54) QUANTUM GATES VIA MULTI-STEP ADIABATIC DRAG

(71) Applicant: Ryan J. Epstein, Denver, CO (US)

(72) Inventor: Ryan J. Epstein, Denver, CO (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 112 days.

(21) Appl. No.: 15/225,162

(22) Filed: Aug. 1, 2016

(65) Prior Publication Data

US 2018/0032893 A1 Feb. 1, 2018

(51) Int. Cl.
 *G06N 10/00* (2019.01)
 *G06F 15/82* (2006.01)

(52) U.S. Cl.
 CPC ............ *G06N 10/00* (2019.01); *G06F 15/82* (2013.01)

(58) Field of Classification Search
 CPC .............................. G06N 99/002; G06F 15/82
 See application file for complete search history.

(56) References Cited

U.S. PATENT DOCUMENTS

| 7,893,708 | B2 | 2/2011 | Baumgardner et al. |
| 8,138,784 | B2 | 3/2012 | Przybysz et al. |
| 8,631,367 | B2 | 1/2014 | Pesetski et al. |
| 9,543,959 | B1 | 1/2017 | Carmean |
| 2003/0055513 | A1* | 3/2003 | Raussendorf ......... B82Y 10/00 700/1 |
| 2009/0002014 | A1 | 1/2009 | Gupta |
| 2014/0203838 | A1 | 7/2014 | Pesetski et al. |
| 2014/0223224 | A1* | 8/2014 | Berkley ............. G06F 11/0724 714/10 |
| 2015/0254571 | A1 | 9/2015 | Miller |

FOREIGN PATENT DOCUMENTS

| CN | 101626233 A | 1/2010 |
| CN | 101626234 A | 1/2010 |
| WO | 2008089067 | 7/2008 |

OTHER PUBLICATIONS

Bacon, et al., "Adiabatic gate teleportation." *Physical review letters* 103.12 (2009): 120504.
Bacon. "Operator quantum error-correcting subsystems for self-correcting quantum memories." *Physical Review A* 73.1 (2006): 012340.
Douçot, et al. "Protected qubits and Chern-Simons theories in Josephson junction arrays." *Physical Review B* 71.2 (2005): 024505.

(Continued)

*Primary Examiner* — Feifei Yeung Lopez
(74) *Attorney, Agent, or Firm* — Tarolli, Sundheim, Covell & Tummino LLP (57) ABSTRACT

Systems and methods are provided for performing a quantum gate operation. The system includes a first physical qubit, and a second physical qubit operatively coupled to the first physical qubit via a coupling mechanism. The first physical qubit, the second physical qubit, and the coupling mechanism form a logical qubit. At least one control mechanism is configured to provide a control signal to one of the first physical qubit, the second physical qubit, and the coupling mechanism as to adjust a Hamiltonian of the logical qubit.

19 Claims, 4 Drawing Sheets

(56) References Cited

OTHER PUBLICATIONS

Jiang, et al. . "Non-commuting two-local Hamiltonians for quantum error suppression." arXiv preprint arXiv:1511.01997(2015).
Marvian, et al. . "Error suppression for Hamiltonian-based quantum computation using subsystem codes." arXiv preprint arXiv:1606.03795 (2016).
Bacon, D. et al.: "Adiabatic Gate Teleportation", Arxiv.Org, Cornell University Ithaca, NY 14853, May 6, 2009 (May 6, 2009), Abstract p. 1, left-hand column, line 1-3, right-hand column, paragraph 3 p. 5; figure 2.
Warren, R. "Gates for Adiabatic Quantum Computing", Aug. 26, 2014 (Aug. 26, 2014), Retrieved from the Internet: URL:https://arxiv.org/ftp/arxiv/papers/1405/1405.2354.pdf [retrieved on Jan. 8, 2018]. Abstract. Section 5.
International Search Report corresponding to International Application No. PCT/US2017/041749, dated Jun. 6, 2018.
International Written Opinion and Search Report corresponding to International Application No. PCT/US2018/056310 dated Jan. 10, 2019
International Written Opinion and Search Report corresponding to International Application No. PCT/US2018/056316 dated Jan. 25, 2019.
International Written Opinion and Search Report corresponding to International Application No. US/PCT20181056305 dated Jan. 30, 2019.
Narendran, S. et al.: "Quantum computation based on Reciprocal Quantum logic", 2017 International Conference on Nextgen Electronic Technologies; Silicon to Software (ICNETS2), IEEE, Mar. 23, 2017 (Mar. 23, 2017), pp. 34-37 Retrieved on Oct. 13, 2017. p. 25, right hand column, paragraph 1; figures 6,7.
Likharev, K.K. et al.: "RSFQ Logic/Memory Family: A New Josephson-Junction Technology for Sub-Terahertz-lock-Frequency Digital Systems," IEEE Transactions on Applied Superconductivity, vol. 1 No. 1, Mar. 1991.
Kotani S. et al.: "Ultrahigh-speed logic gate family with Nb/A1-A10 x / Nb Josephson junctions", IEEE Transactions on Election Devices, vol. 33, No. 3, Mar. 1, 1986 (Mar. 1, 1986), pp. 379-384.

* cited by examiner

QUANTUM GATES VIA MULTI-STEP ADIABATIC DRAG

GOVERNMENT INTEREST

The invention was made under US Government Contract Number 30069353. Therefore, the US Government has rights to the invention as specified in that contract.

TECHNICAL FIELD

This invention relates to quantum computing, and more particularly, to performing quantum gates via an inventive method of multi-step adiabatic drag.

BACKGROUND

A classical computer operates by processing binary bits of information that change state according to the laws of classical physics. These information bits can be modified by using simple logic gates such as AND and OR gates. The binary bits are physically created by a high or a low signal level occurring at the output of the logic gate to represent either a logical one (e.g., high voltage) or a logical zero (e.g., low voltage). A classical algorithm, such as one that multiplies two integers, can be decomposed into a long string of these simple logic gates. Like a classical computer, a quantum computer also has bits and gates. Instead of using logical ones and zeroes, a quantum bit ("qubit") uses quantum mechanics to occupy both possibilities simultaneously. This ability and other uniquely quantum mechanical features enable a quantum computer can solve certain problems exponentially faster than a classical computer.

SUMMARY OF THE INVENTION

In accordance with an aspect of the present invention, a system is provided for performing a quantum gate operation. The system includes a first physical qubit, and a second physical qubit operatively coupled to the first physical qubit via a coupling mechanism. The first physical qubit, the second physical qubit, and the coupling mechanism form a logical qubit. At least one control mechanism is configured to provide a control signal to one of the first physical qubit, the second physical qubit, and the coupling mechanism as to adjust a Hamiltonian of the logical qubit.

In accordance with another aspect of the present invention, a method for performing a quantum gate is provided. Each of a first physical qubit and a second physical qubit are prepared in a ground state associated with a first Hamiltonian associated with the quantum gate. A first control signal is applied to the system such that a Hamiltonian of the system is the first Hamiltonian of the system. The system includes the first physical qubit, the second physical qubit, and a coupling mechanism configured such that, when active, quantum information can pass between the first physical qubit and the second physical qubit. An adiabatic interpolation of the Hamiltonian of the system from the first Hamiltonian to a second Hamiltonian is performed adiabatically. An adiabatic interpolation of the Hamiltonian of the system from the second Hamiltonian to a third Hamiltonian is performed adiabatically.

In accordance with yet another aspect of the present invention, a method for performing a quantum gate is provided. Each of a first physical qubit and a second physical qubit are prepared in a ground state associated with a first Hamiltonian of a system comprising the first physical qubit, the second physical qubit, and a coupling mechanism configured such that, when a coupling strength of the coupling mechanism is non-zero, quantum information can pass between the first physical qubit and the second physical qubit. A first control signal is applied to the system such that the energy level of a first X eigenstate of the second physical qubit is increased relative to an energy level of a second X eigenstate of the second physical qubit. A first adiabatic interpolation of the Hamiltonian of the system is performed such that the first control signal is ramped down to change the strength of the first Hamiltonian from non-zero to zero while a second control signal is ramped up to change the coupling strength of the coupling mechanism from zero to a non-zero value. A second adiabatic interpolation of the Hamiltonian of the system is performed such that the energy level of a first eigenstate of one of the first and second physical qubits along a defined axis of the Bloch sphere is increased relative to an energy level of a second eigenstate of the one of the first and second physical qubits while the coupling strength of the coupling mechanism is returned to zero.

DETAILED DESCRIPTION

The inventor has provided a method for performing quantum gates, Multistep Adiabatic Drag (MAD), that is insensitive to noise and imperfections on control signals. The method is well-suited for qubits that can be tuned to have degenerate energy levels, such as superconducting flux qubits with a tunable tunnel barrier height. Multistep adiabatic drag gates do not require AC control fields such as microwave pulses but instead use simple non-oscillating pulses which can be generated by Reciprocal Quantum Logic driven digital to analog converters (RQL DACs). The scheme does not depend on an enclosed area in control parameter space, which can be distorted by noise. The Multistep adiabatic drag technique is also remarkably robust to control noise. The Multistep adiabatic drag technique can also be performed, for a single qubit gate, with two physical qubits without precisely equal interaction strengths among qubits. Furthermore, the Hamiltonians, which determine how the system evolves during MAD gates, only use a small number of one-qubit and two-qubit terms. MAD gates also do not require quantum teleportation of information among qubits, further differentiating it from previous efforts.

Figure 1:
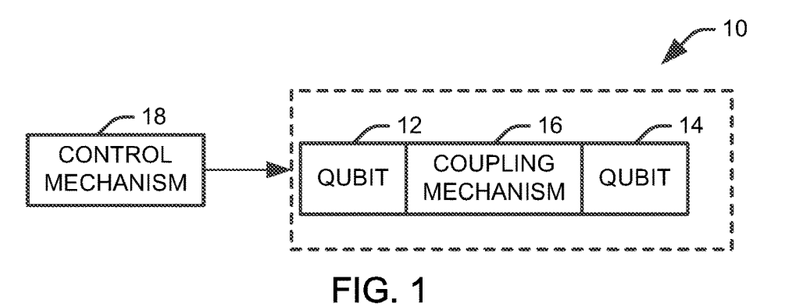
FIG. 1 illustrates one example of system for performing a quantum gate operation.

FIG. 1 illustrates one example of system 10 for performing a quantum gate operation. The system includes a first physical qubit 12 and a second physical qubit 14 operatively coupled to the first physical qubit via a coupling mechanism 16. Each of the qubits 12 and 14 can be implemented in any appropriate quantum technology with the herein-prescribed tunable couplings and single qubit control, including superconducting circuits, such as Cooper pair boxes or flux qubits comprised of Josephson junctions, quantum dots, photonic circuits, ion traps and others. In the multistep adiabatic drag method, the first physical qubit 12, the second physical qubit 14, and the coupling mechanism 16 collectively form a logical qubit for at least part of the quantum gate, although it will be appreciated that, during part of the method, quantum information associated with the logical qubit can be isolated in one of the physical qubits 12 and 14. The system further includes at least one control mechanism 18 that is configured to provide a control signal to one of the first qubit 12, the second qubit 14, and the coupling mechanism 16 as to adjust a Hamiltonian of the logical qubit.

It will be appreciated that the nature of each coupling mechanism 16 and at least one control mechanism 18 will vary with the implementation and the specific gate performed. Examples of coupling devices include superconducting circuits containing RF-SQUIDs or DC-SQUIDs, which inductively couple qubits together by their flux; the coupling strength can be tuned via a control flux. SQUIDs include a superconducting loop interrupted by one Josephson junction (an RF-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. The control mechanism 18 can be used to tune a coupling strength of the coupling devices between zero and a maximum value.

The various gates performed by this system are derived by tracking the evolution of logical operators, providing a powerful way to design Hamiltonians to achieve a desired gate. The interactions used in performing gates create an energy gap to states outside the computational subspace with excitations to states above the gap are suppressed by nearly adiabatic time-evolution and ensuring that the thermal excitation rate is acceptably low relative to the gate time. This makes the scheme very robust to noise on the strength of Hamiltonian terms since a precise interpolation path is not required to achieve a given gate.

The behavior of a MAD gate can be determined by tracking the evolution of logical operators. Note that a general single qubit quantum state can be written as a density operator $\rho = (I + \langle X \rangle X' + \langle Y \rangle Y' + \langle Z \rangle Z')/2$, where X, Y and Z are Pauli operators and $\langle \cdot \rangle$ is the expectation value. A general unitary gate operation transforms X, Y, and Z into X', Y', and Z', which are linear combinations of the original Pauli operators the preserve the original commutation relations. After the gate, the density operator becomes $\rho' = (I + \langle X \rangle X' + \langle Y \rangle Y' + \langle Z \rangle Z')/2$, which is a rotation of the coordinate system. Assuming the expectation values remain constant, the new Pauli operators completely specify the new state and the rotation vector that defines the gate can be determined from the angle between the original and new coordinate systems. This can be readily extended to more than one qubit.

Figure 2:
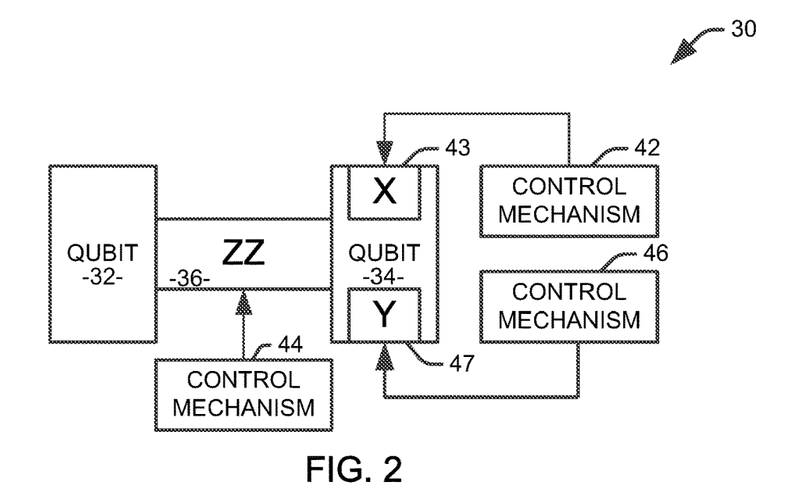
FIG. 2 illustrates one example of a quantum circuit for performing an S gate.

FIG. 2 illustrates one example of a quantum circuit 30 for performing an S gate. The illustrated quantum circuit 30 is an example of a single qubit gate, using three Hamiltonians $H_1 = -g_1 IX$, $H_2 = -g_2 ZZ$, and $H_3 = +g_3 IY$, where $g_i \geq 0$ are the time-dependent strengths of the Hamiltonians, and tensor products between adjacent Pauli operators are implied. Both physical qubits 32 and 34 are assumed to be initialized in the ground space of the starting Hamiltonian and, under ideal adiabatic evolution, remain in the ground space throughout the gate operation. Initialization to the state $|0\rangle(|0\rangle + |1\rangle)/\sqrt{2}$, for example, could be achieved by applying $H_0 = -g_0 ZI - g_1 IX$ with $g_0 \approx g_1$, letting the system thermally relax in a bath with thermal energy well below the energy gap set by $g_0$ and $g_1$, and then turning off $g_0$.

In performing the gate, $H_1$ can be turned "on", that is, $g_1$ can be increased above zero, and the other two be turned "off" such that $g_2 = g_3 = 0$. The first physical qubit 32 is unaffected by $H_1$ so the first physical qubit's 32 two states are energetically degenerate. The Hamiltonian is equivalent to that of a spin-½ system in a magnetic field applied along the X direction, putting the second qubit in the state $|+\rangle = (|0\rangle + |1\rangle)/\sqrt{2}$. The ground space of $H_1$ is therefore spanned by $|0+\rangle$ and $|1+\rangle$, and can encode a qubit. This encoding is clearly trivial since the quantum information resides solely on qubit 1. For $H_2$, the ground space is also doubly degenerate and is spanned by $|00\rangle$ and $|11\rangle$. Finally, for $H_3$ the ground space is spanned by $|0-_i\rangle$ and $|1-_i\rangle$, where $|-_i\rangle = (|0\rangle - i|1\rangle)/\sqrt{2}$.

Logical Pauli operators that commute with both $H_1$ and $H_2$ and act as desired on the selected basis states can be defined. These are found by inspection to be $\overline{X} = XX$ and $\overline{Z} = ZI$ and it can be verified that they act on the states just as X and Z operators act on $|0\rangle$ and $|1\rangle$. Likewise for $H_2$ and $H_3$, two logical operators are $\overline{X}' = -YY$ and $\overline{Z} = ZI$. The eigenstates evolve for interpolation between $H_1$ and $H_2$. Since $\overline{Z}$ commutes with $H_1$ and $H_2$, $\overline{Z}$ also commutes with the propagator $\exp(-i\int H(t)dt)$, where $H(t) = H_1(t) + H_2(t)$, and time-ordering in the integral is implied. Therefore, a state initialized to the +1 eigenspace of $\overline{Z}$ will remain there for the entire leg of the gate, which implies $|0+\rangle$ is transformed to $|00\rangle$ once only $g_2$ is turned on. By the same argument $|1+\rangle \rightarrow |11\rangle$. Now with only $g_2$ being on, both XX and -YY act as a logical X operator, flipping the logical bit. As $g_3$ starts to turn on, XX no longer commutes with the total Hamiltonian but -YY does. Thus, there is a "handoff" between logical operators XX and -YY. Once $g_2$ has turned off and only $g_3$ is on, the quantum information is localized back on the first physical qubit 32. Now, however, the -YY operator acts like a logical Y. Thus, the logical operators have undergone the transformation $\overline{X} \rightarrow \overline{Y}$ and $\overline{Z} \rightarrow \overline{Z}$. Since the transformation of the Pauli operators X, and Z uniquely define the behavior of the gate, the gate is a 90 degree rotation about the z axis, which is the S gate (where $S^2 = Z$). Since the physical qubits 32 and 34 are not entangled (i.e., they are in a product state) at the end of the gate, it is not necessary to close a loop in parameter space by returning to the initial Hamiltonian at the end of the gate, although such a closing of a loop may be useful for performing subsequent gates. If YI were chosen for $H_3$ instead of IY, the quantum information would have been swapped to the second physical qubit 34.

The precise temporal profiles of $g_i$ pulses are not critical as long as the pulses are turned off close to zero and there is temporal overlap between pulses $g_i$ and $g_{i+1}$ such that a sufficiently large energy gap to excited states is maintained relative to the speed of the gate and the temperature of the system. The adiabatic interpolation of the Hamiltonians can thus be performed by ramping up the $g_{i+1}$ pulse while the $g_i$ pulse is ramped down. This grants MAD gates significant robustness to control noise.

Selection of Hamiltonians for a given gate is primarily based on constraining the transformations of the logical operators and controlling the localization of quantum information, while maintaining an energy gap to undesired states. The gaps are verified by calculating the eigenvalues of the system throughout the gate sequence but, as a rule of thumb, interpolating between Pauli terms that anti-commute will generally maintain a gap. As simple examples, Z→X→-Z maintains a gap, whereas Z→-Z does not. Two commutation rules provide the primary constraints on logical operator evolution, specifically logical operators must commute with arbitrarily weighted sums of the relevant two Hamiltonians and all logical operators must have proper commutation relations with each other throughout the gate sequence.

As for localization, single qubit terms, such as IX, act to expel quantum information from the qubits that the single qubit terms act on, in this case, the second physical qubit 34. In contrast, two-qubit terms act to delocalize the quantum information across the two qubits. Moving quantum information is useful for changing the way a logical operator acts. For example, a logical XZ operator acts like X when the encoded qubit is localized on the first physical qubit and the logical XZ operator acts like Z when the encoded qubit is localized on the second physical qubit.

Accordingly, the quantum circuit 30 includes a ZZ coupling mechanism 36 configured to make it energetically favorable for the states of the first and second physical qubits to align in the same direction along the Z-axis, both pointing either in the +Z direction or both in the -Z direction. Each axis corresponds to a specific quantum state defined on the Bloch sphere of the qubit. In the case of a superconducting flux qubit, the persistent current in the qubit loop is commonly associated with the Z-axis of the Bloch sphere, and a ZZ interaction may be realized between two superconducting flux qubits by coupling information relating to the persistent current in the qubit loop of a first qubit to the qubit loop of a second qubit, for example, inductively via a loop placed between the two physical qubits 32 and 34. It will be appreciated, however, that the specific implementation of the coupling mechanism 36 will vary with the nature of the physical qubits and the desired coupling, and implementation of a specific coupling mechanism should be apparent to one of skill in the art in view of the invention disclosed herein.

A first control mechanism 42 provides a first control signal to provide the Hamilton IX, illustrated in the circuit 30 as an X operator 43 on the second physical qubit 34. Effectively, the first control mechanism 42 alters an environment of the second physical qubit, for example, via application of magnetic flux, such that one of the X eigenstates of the physical qubit 34 has an energy lower than the other X eigenstate of the physical qubit. As a result, the state of the second physical qubit 34 evolves to the |+⟩ state. A second control mechanism 44 provides the Hamiltonian ZZ. To this end, the second control mechanism provides a second control signal that tunes a coupling strength of the coupling mechanism 36 from zero to a non-zero value, creating an energy difference between certain quantum states along the Z-axis of the two physical qubits 32 and 34. Finally, a third control mechanism 46 provides a third control signal to provide the Hamilton IY, illustrated in the circuit 30 as a Y operator 47 on the second physical qubit 34. To this end, the third control mechanism 46 alters an environment of the second physical qubit, for example, via application of magnetic flux, such that one of the Y eigenstates of the physical qubit 34 has an energy lower than the other of the Y eigenstate of the physical qubit. The result of the adiabatic interpolation from the first Hamiltonian to the second Hamiltonian to the third Hamiltonian provides a ninety degree rotation of the logical qubit around the Z-axis of the Bloch sphere, referred to as an S-gate.

Figure 3:
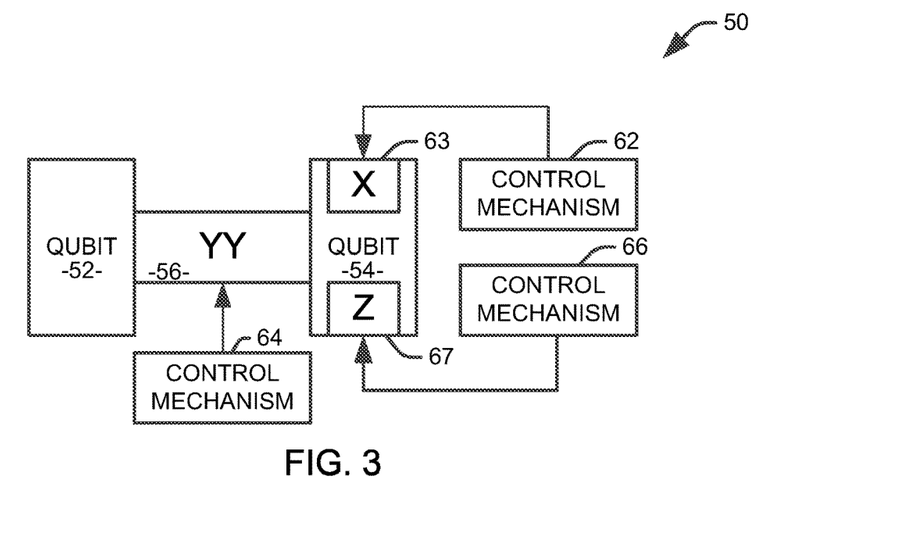
FIG. 3 illustrates one example of a quantum circuit for performing a ninety degree rotation of a logical qubit around a Y-axis of the Bloch sphere.

FIG. 3 illustrates one example of a quantum circuit 50 for performing a ninety degree rotation of a logical qubit around a Y-axis of the Bloch sphere. The illustrated quantum circuit 50 is an example of a single qubit gate, using the Hamiltonian $-g_1 IX - g_2 YY - g_3 IZ$, where $g_i \geq 0$ are the time-dependent strengths of the Hamiltonians controlled by respective control signals, and tensor products between adjacent Pauli operators are implied. Two physical qubits 52 and 54 are assumed to be initialized in the ground space of the starting Hamiltonian and, under ideal adiabatic evolution, remain in the ground space throughout the gate operation. A YY coupling mechanism 56 is configured to make it energetically favorable for the states of the first and second physical qubits to point in the same direction along the Y-axis, both pointing in the +Y direction or both in the -Y direction. Each axis corresponds to a specific quantum state defined on the Bloch sphere of the qubit. States $(|0\rangle + i|1\rangle)/\sqrt{2}$ and $(|0\rangle - i|1\rangle)/\sqrt{2}$ point in the +Y and -Y directions, respectively.

A first control mechanism 62 provides a first control signal to provide the Hamilton IX, illustrated in the circuit 50 as an X operator 63 on the second physical qubit 54. Effectively, the first control mechanism 62 alters an environment of the second physical qubit, for example, via application of magnetic flux, such that one of the X eigenstates of the physical qubit 54 has an energy lower than the other of the X eigenstates of the physical qubit. As a result, the state of the second physical qubit evolves to the |+⟩ state. A second control mechanism 64 provides the Hamiltonian ZZ. To this end, the second control mechanism provides a second control signal that tunes a coupling strength of the coupling mechanism 56 from zero to a non-zero value, creating an energy difference between certain states along the Y-axes of the two physical qubits 52 and 54. Finally, a third control mechanism 66 provides a third control signal to provide the Hamilton IZ, illustrated in the circuit 50 as a Z operator 67 on the second physical qubit 54. To this end, the third control mechanism 66 alters an environment of the second physical qubit, for example, via application of magnetic flux, such that one of the Z eigenstates of the physical qubit 54 has an energy lower than the other Z eigenstate of the physical qubit. The result of the adiabatic interpolation from the first Hamiltonian to the second Hamiltonian to the third Hamiltonian provides a ninety degree rotation of the logical qubit around the Y-axis of the Bloch sphere.

Figure 4:
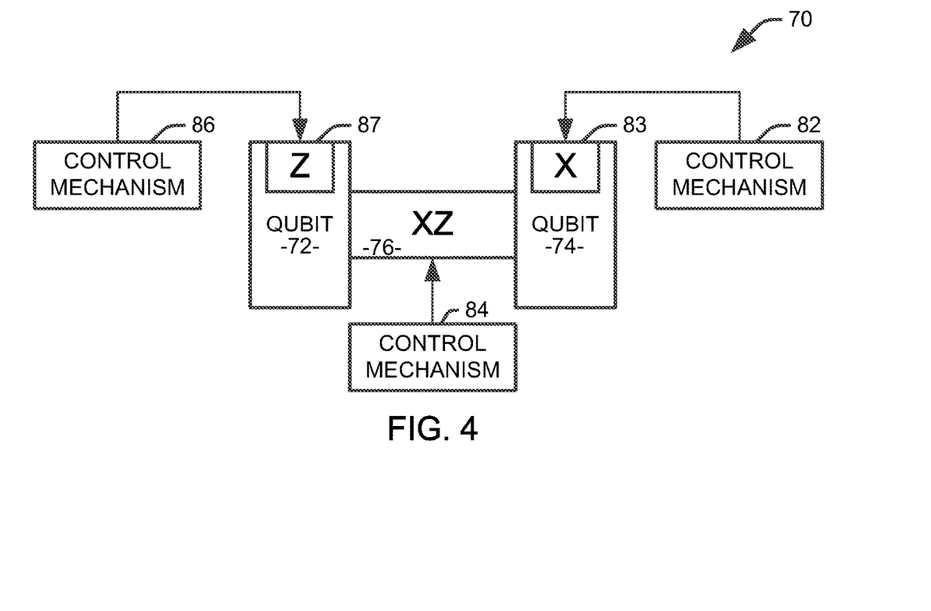
FIG. 4 illustrates one example of a quantum circuit for performing a Hadamard gate.

FIG. 4 illustrates one example of a quantum circuit 70 for performing a Hadamard gate. The illustrated quantum circuit 70 is an example of a single qubit gate, using the Hamiltonian $-g_1 IX - g_2 XZ - g_3 ZI$, where $g_i \geq 0$ are the time-dependent strengths of the Hamiltonians controlled by respective control signals, and tensor products between adjacent Pauli operators are implied. Two physical qubits 72 and 74 are assumed to be initialized in the ground space of the starting Hamiltonian and, under ideal adiabatic evolution, remain in the ground space throughout the gate operation. An XZ coupling mechanism 76 configured to make it energetically favorable for the states of the first and second physical qubits to point along the +X and +Z directions, respectively, or in the -X and -Z directions, respectively.

A first control mechanism 82 provides a first control signal to provide the Hamilton IX, illustrated in the circuit 70 as an X operator 83 on the second physical qubit 74. Effectively, the first control mechanism 82 alters an environment of the second physical qubit, for example, via application of magnetic flux, such that one of the X eigenstates of the physical qubit 74 has an energy lower than the other X eigenstate of the physical qubit. As a result, the state of the second physical qubit evolves to the |+> state. A second control mechanism 84 provides the Hamiltonian XZ. To this end, the second control mechanism provides a second control signal that tunes a coupling strength of the coupling mechanism 76 from zero to a non-zero value, allowing for an interaction between the X-axis of the first physical qubit 72 and the Z-axis of the second physical qubit 74. Finally, a third control mechanism 86 provides a third control signal to provide the Hamilton ZI, illustrated in the circuit 70 as a Z operator 87 on the first physical qubit 72. To this end, the third control mechanism 88 alters an environment of the first physical qubit, for example, via application of magnetic flux, such that one of the Z eigenstates of the physical qubit 72 has an energy lower than the other Z eigenstate of the physical qubit. The result of the adiabatic interpolation from the first Hamiltonian to the second Hamiltonian to the third Hamiltonian provides a one hundred and eighty degree rotation of the logical qubit around $\hat{X}+\hat{Z}$ on the Bloch sphere, performing a Hadamard gate.

Figure 5:
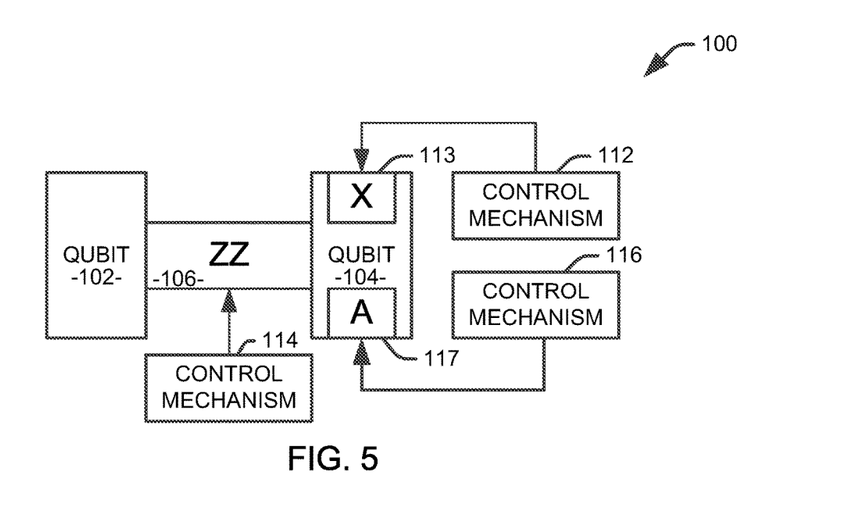
FIG. 5 illustrates one example of a quantum circuit for performing a T gate.

FIG. 5 illustrates one example of a quantum circuit 100 for performing a T gate. The illustrated quantum circuit 100 is an example of a single qubit gate, using the Hamiltonian $-g_1 IX-g_2 ZZ-g_3 IA$, where $g_i \geq 0$ are the time-dependent strengths of the Hamiltonians controlled by respective control signals, A=X+Y, and tensor products between adjacent Pauli operators are implied. Two physical qubits 102 and 104 are assumed to be initialized in the ground space of the starting Hamiltonian and, under ideal adiabatic evolution, remain in the ground space throughout the gate operation. A ZZ coupling mechanism 106 is configured to make it energetically favorable for the states of the first and second physical qubits to align in the same direction along the Z-axis, both pointing either in the +Z direction or both in the −Z direction. Each axis corresponds to a specific quantum state defined on the Bloch sphere of the qubit.

A first control mechanism 112 provides a first control signal to provide the Hamilton IX, illustrated in the circuit 100 as an X operator 113 on the second physical qubit 104. Effectively, the first control mechanism 112 alters an environment of the second physical qubit, for example, via application of magnetic flux, such that one of the X eigenstates of the physical qubit 104 has an energy lower than the other of the X eigenstates of the physical qubit. As a result, the state of the second physical qubit evolves to the |+> state. A second control mechanism 114 provides the Hamiltonian ZZ. To this end, the second control mechanism provides a second control signal that tunes a coupling strength of the coupling mechanism 106 from zero to a non-zero value, allowing for an interaction along the Z-axis of the first physical qubit 102 and the Z-axis of the second physical qubit 104. Finally, a third control mechanism 116 provides a third control signal to provide the Hamilton IA, illustrated in the circuit 100 as an A operator 117 on the second physical qubit 104. To this end, the third control mechanism 118 alters an environment of the second physical qubit, for example, via application of magnetic flux, such that one of the A eigenstates of the physical qubit 104 has an energy lower than the other of the A eigenstates of the physical qubit. The result of the adiabatic interpolation from the first Hamiltonian to the second Hamiltonian to the third Hamiltonian provides a forty-five degree rotation of the logical qubit around the Z axis on the Bloch sphere, performing a T gate.

Figure 6:
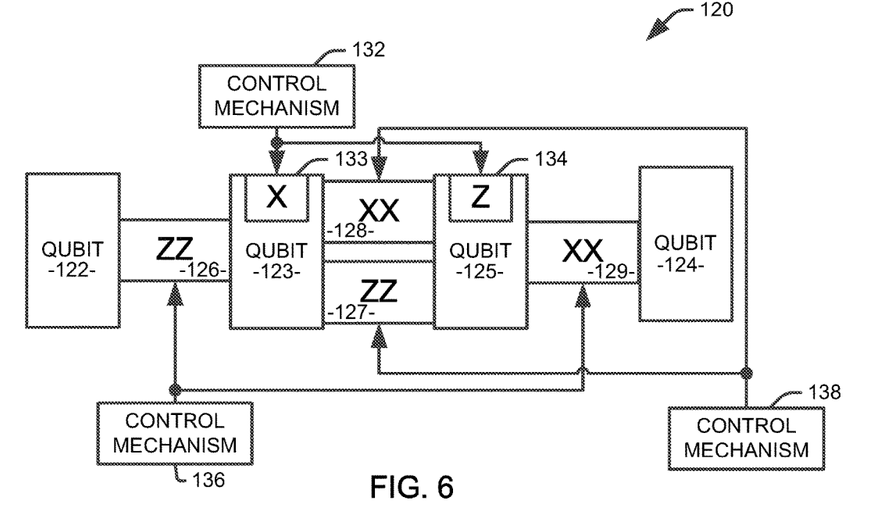
FIG. 6 illustrates one example of a quantum circuit for performing a CNOT gate.

FIG. 6 illustrates one example of a quantum circuit 120 for performing a CNOT gate. The illustrated quantum circuit 120 is an example of a two logical qubit gate performed over four physical qubits, using the Hamiltonian $-g_1(IXII+IIIZ)-g_2(ZZII+IIXX)-g_3(IXIX+IZIZ)$, where $g_i \geq 0$ are the time-dependent strengths of the Hamiltonians controlled by respective control signals and tensor products between adjacent Pauli operators are implied. Four physical qubits 122-125 are assumed to be initialized in the ground space of the starting Hamiltonian and, under ideal adiabatic evolution, remain in the ground space throughout the gate operation. A first ZZ coupling mechanism 126 is configured to couple the Z-axis of the first physical qubit 122 and a Z-axis of the second physical qubit 123. A second ZZ coupling mechanism 127 is configured to couple states along a Z-axis of the second physical qubit 123 and a Z-axis of the fourth physical qubit 125. A first XX coupling mechanism 128 is configured to couple states along an X-axis of the second physical qubit 123 and an X-axis of the fourth physical qubit 125. A second XX coupling mechanism 129 is configured to couple states along an X-axis of the fourth physical qubit 125 and an X-axis of the third physical qubit 124. Each axis corresponds to a specific quantum state defined on the Bloch sphere of the qubit.

A first control mechanism 132 provides a first control signal to provide the Hamilton IXII+IIIZ, illustrated in the circuit 120 as an X operator 133 on the second physical qubit 123 and a Z operator 134 on the fourth physical qubit 125. A second control mechanism 136 provides the Hamiltonian ZZII+IIXX. To this end, the second control mechanism 136 provides a second control signal that tunes a coupling strength of the each of first ZZ coupling mechanism 126 and the second XX coupling mechanism 129 from zero to a non-zero value. Finally, a third control mechanism 138 provides a third control signal to provide the Hamilton IXIX+IZIZ. To this end, the third second control mechanism 138 provides a third control signal that tunes a coupling strength of the each of second ZZ coupling mechanism 127 and the first XX coupling mechanism 128 from zero to a non-zero value. The result of the adiabatic interpolation from the first Hamiltonian to the second Hamiltonian to the third Hamiltonian provides a controlled NOT operation on a target logical qubit using a control logical qubit.

Figure 7:
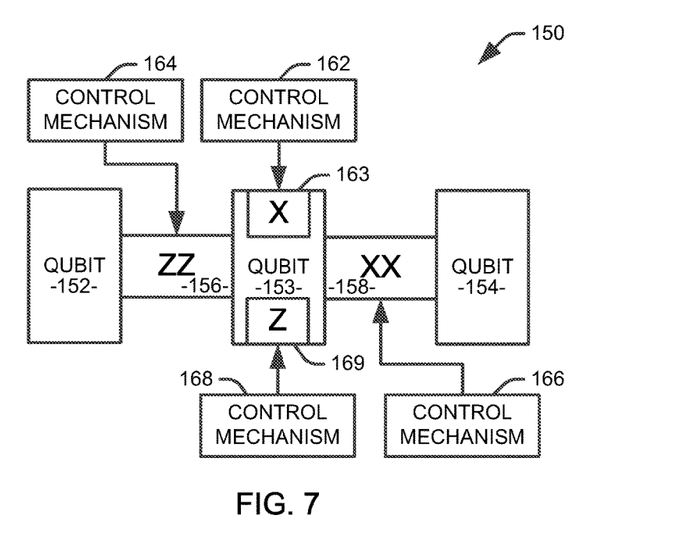
FIG. 7 illustrates another example of a quantum circuit for performing a CNOT gate.

FIG. 7 illustrates a second example of a quantum circuit 150 for performing a CNOT gate with only three physical qubits. The illustrated quantum circuit 150 is an example of a two logical qubit gates performed over three qubits, using the Hamiltonian $-g_1 IXI-g_2 ZZI-g_3 IXX-g_4 IZI$, where $g_i \geq 0$ are the time-dependent strengths of the Hamiltonians controlled by respective control signals and tensor products between adjacent Pauli operators are implied. Three physical qubits 152-154 are assumed to be initialized in the ground space of the starting Hamiltonian and, under ideal adiabatic evolution, remain in the ground space throughout the gate operation. A ZZ coupling mechanism 156 is configured to couple states along a Z-axis of the first physical qubit 152 and a Z-axis of the second physical qubit 153. An XX coupling mechanism 158 is configured to couple states along an X-axis of the second physical qubit 153 and an X-axis of the third physical qubit 154. Each axis corresponds to a specific quantum state defined on the Bloch sphere of the qubit.

A first control mechanism 162 provides a first control signal to provide the Hamilton IXI, illustrated in the circuit 150 as an X operator 163 on the second physical qubit 153. A second control mechanism 164 controls the Hamiltonian ZZI. To this end, the second control mechanism 164 provides a second control signal that tunes a coupling strength of the ZZ coupling mechanism 156 from zero to a non-zero value. A third control mechanism 166 provides a third control signal to control the Hamilton IXX. To this end, the third control mechanism 166 provides a third control signal that tunes a coupling strength of the XX coupling mechanism 158 from zero to a non-zero value. A fourth control mechanism 168 provides a first control signal to control the Hamilton IZI, illustrated in the circuit 150 as a Z operator 169 on the second physical qubit 153. The result of the adiabatic interpolation between the four Hamiltonians provides a controlled NOT operation on a target logical qubit using a control logical qubit.

Figure 8:
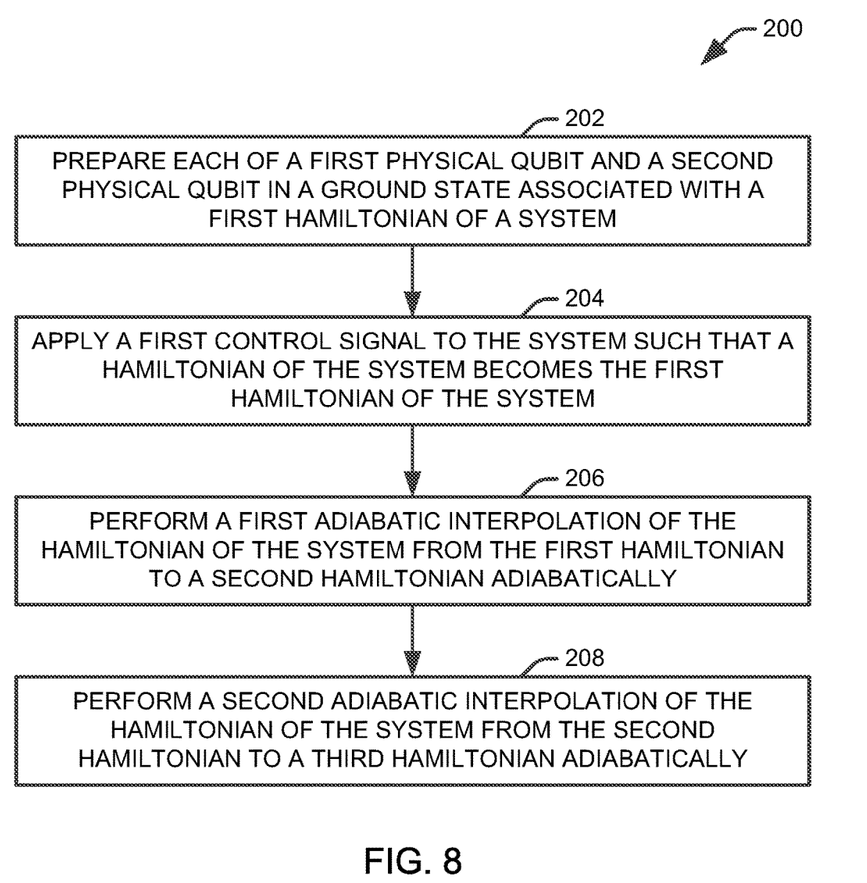
FIG. 8 illustrates one example of a method for performing a quantum gate.

In view of the foregoing structural and functional features described above in FIGS. 1-7, example methods will be better appreciated with reference to FIG. 8. While, for purposes of simplicity of explanation, the method of FIG. 8 is shown and described as executing serially, it is to be understood and appreciated that the present invention is not limited by the illustrated order, as some actions could in other examples occur in different orders and/or concurrently from that shown and described herein.

FIG. 8 illustrates one example of a method 200 for performing a quantum gate. At 202, each of a first physical qubit and a second physical qubit are prepared in a ground state associated with a first Hamiltonian of a system. The system includes the first physical qubit, the second physical qubit, and a coupling mechanism configured such that, when a coupling strength of the coupling mechanism is non-zero, quantum information can pass between the first physical qubit and the second physical qubit. At 204, a first control signal is applied to the system such that a Hamiltonian of the system becomes the first Hamiltonian of the system. In one implementation, a first control signal is applied to the system such that the energy level of a first X eigenstate of the second physical qubit is increased relative to an energy level of a second X eigenstate of the second physical qubit.

At 206, a first adiabatic interpolation of the Hamiltonian of the system from the first Hamiltonian to a second Hamiltonian is performed adiabatically. In one implementation, the first adiabatic interpolation of the Hamiltonian is performed such that the first control signal is removed while a second control signal is applied to change the coupling strength of the coupling mechanism from zero to a non-zero value. At 208, a second adiabatic interpolation of the Hamiltonian of the system from the second Hamiltonian to a third Hamiltonian is performed adiabatically to complete the quantum gate operation. In one implementation, the second adiabatic interpolation of the Hamiltonian is performed such that the energy level of a first eigenstate of one of the first physical qubit and the second physical qubit along a defined axis of the Bloch sphere is increased relative to an energy level of a second eigenstate of the one of the first physical qubit and second physical qubit while the coupling strength of the coupling mechanism is returned to zero.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for performing a quantum gate operation that is highly resilient to noise on control signals, the system comprising:
   a plurality of physical qubits comprising a first physical qubit and a second physical qubit;
   at least one coupling mechanism are configured such that each coupling mechanism operatively couples at most two qubits, the plurality of physical qubits, and the at least one coupling mechanism forming at least one logical qubit; and
   at least one control mechanism, configured to provide a control signal to one of the first physical qubit, the second physical qubit, and the coupling mechanism as to adiabatically adjust a Hamiltonian of the logical qubit from a first Hamiltonian to a second Hamiltonian by adjusting a coupling strength of a coupling mechanism of the at least one coupling mechanism from zero to a non-zero value;
   wherein a number of physical qubits in the system is at most twice a number of logical qubits.

2. The system of claim 1, wherein the quantum gate operation is a ninety degree Y rotation, and the coupling mechanism comprises a YY coupler configured to couple states along a Y-axis of the first physical qubit and a Y-axis of the second physical qubit.

3. The system of claim 1, wherein the quantum gate operation is a Hadamard gate, and the coupling mechanism comprises an XZ coupler configured to couple states along an X-axis of the first physical qubit and a Z-axis of the second physical qubit.

4. The system of claim 1, wherein the quantum gate operation is one of an S gate and a T gate, and the coupling mechanism comprises a ZZ coupler configured to couple states along a Z-axis of the first physical qubit and a Z-axis of the second physical qubit.

5. The system of claim 1, wherein the at least one control mechanism comprises a first control mechanism, configured to provide a first control signal to adjust the strength, $g_1$, of a first Hamiltonian, a second control mechanism, configured to provide a second control signal to adjust the strength, $g_2$, of second Hamiltonian, and a third control mechanism, configured to provide a third control signal to adjust the strength, $g_3$, of a third Hamiltonian, the Hamiltonian of the logical qubit at any given time comprising a linear combination of the first, second, and third Hamiltonians with strengths defined by the first, second, and third control signals.

6. The system of claim 5, wherein the quantum gate operation is a ninety degree Y rotation, and the first Hamiltonian is $g_1$IX, the second Hamiltonian is $g_2$YY, and the third Hamiltonian is $g_3$IZ, where X, Y, and Z are Pauli operators and I is the identity operator.

7. The system of claim 5, wherein the quantum gate operation is a Hadamard gate, and the first Hamiltonian is $g_1$IX, the second Hamiltonian is $g_2$XZ, and the third Hamiltonian is $g_3$ZI, where X and Z are Pauli operators and I is the identity operator.

8. The system of claim 5, wherein the quantum gate operation is a T gate, and the first Hamiltonian is $g_1$IX, the second Hamiltonian is $g_2$ZZ, and the third Hamiltonian is $g_3$IA, where X, Y, and Z are Pauli operators, A=X+Y, and I is the identity operator.

9. The system of claim 5, wherein the quantum gate operation is an S gate, and the first Hamiltonian is $g_1$IX, the second Hamiltonian is $g_2ZZ$, and the third Hamiltonian is $g_3IY$, where X, Y, and Z are Pauli operators, and I is the identity operator.

10. The system of claim 1, wherein the coupling mechanism is a first coupling mechanism of the at least one coupling mechanism and the logical qubit being a first logical qubit, the system further comprising a third physical qubit operatively coupled to the second physical qubit via a second coupling mechanism of the at least one coupling mechanism, the first physical qubit, the second physical qubit, the third physical qubit, the first coupling mechanism, and the second coupling mechanism forming the first logical qubit and a second logical qubit.

11. The system of claim 10, wherein the quantum gate operation is a controlled NOT gate, and the first coupling mechanism comprises a ZZ coupler configured to couple states along a Z-axis of the first physical qubit and a Z-axis of the second physical qubit, and the second coupling mechanism comprises an XX coupler configured to couple states along an X-axis of the second physical qubit and an X-axis of the third physical qubit.

12. The system of claim 10, wherein the quantum gate operation is a controlled NOT gate and the at least one control mechanism comprises a first control mechanism, configured to provide a first control signal to adjust a strength, $g_1$, of a first Hamiltonian, $g_1IXI$, a second control mechanism, configured to provide a second control signal to adjust a strength, $g_2$, of a second Hamiltonian, $g_2ZZI$, a third control mechanism, configured to provide a third control signal to adjust a strength, $g_3$, of a third Hamiltonian, $g_3IXX$, and a fourth control mechanism, configured to provide a fourth control signal to adjust the strength, $g_4$, of a fourth Hamiltonian, $g_4IZI$, the Hamiltonian of the logical qubit at any given time comprising a linear combination of the first, second, third, and fourth Hamiltonians defined by the first, second, third, and fourth control signals, wherein X and Z are Pauli operators and I is the identity operator.

13. The system of claim 10, the system further comprising a fourth physical qubit operatively coupled to the third physical qubit via a third coupling mechanism of the at least one coupling mechanism, and the third physical qubit being further operatively coupled to the second physical qubit via a fourth coupling mechanism of the at least one coupling mechanism, the first physical qubit, the second physical qubit, the third physical qubit, the fourth physical qubit, the first coupling mechanism, the second coupling mechanism, the third coupling mechanism, and the fourth coupling mechanism forming the first logical qubit and the second logical qubit.

14. The system of claim 13, wherein the quantum gate operation is a controlled NOT gate, and the first coupling mechanism comprises a ZZ coupler configured to couple states along a Z-axis of the first physical qubit and a Z-axis of the second physical qubit, the second coupling mechanism comprises an XX coupler configured to couple states along an X-axis of the second physical qubit and an X-axis of the third physical qubit, the third coupling mechanism comprises an XX coupler configured to couple states along an X-axis of the third physical qubit and an X-axis of the fourth physical qubit, and the fourth coupling mechanism comprises a ZZ coupler configured to couple states along a Z-axis of the second physical qubit and a Z-axis of the third physical qubit.

15. The system of claim 13, wherein the quantum gate operation is a controlled NOT gate and at least one control mechanism comprises a first control mechanism, configured to provide a first control signal to adjust a strength, $g_1$, of a first Hamiltonian, $g_1(IXII+IIIZ)$, a second control mechanism, configured to provide a second control signal to adjust a strength, $g_2$, of a second Hamiltonian, $g_2(ZZII+IIXX)$, and a third control mechanism, configured to provide a third control signal to adjust a strength, $g_3$, of a third Hamiltonian, $g_3(IXIX+IZIZ)$, the Hamiltonian of the logical qubit at any given time comprising a linear combination of the first, second, and third Hamiltonians defined by the first, second, and third control signals, wherein X and Z are Pauli operators and I is the identity operator.

16. A method for performing a universal quantum gate set that is highly resistant to noise on control signals comprising:
preparing each of a first physical qubit and a second physical qubit of a plurality of physical qubits coupled by at least one coupling mechanism, such that each coupling mechanism couples at most two of the plurality of physical qubits, in a ground state associated with a first Hamiltonian associated with the quantum gate;
applying a first control signal to system such that a Hamiltonian of the system is the first Hamiltonian of the system, the system comprising a plurality of logical qubits formed from the plurality of physical qubits and the at least one coupling mechanism such that a number of physical qubits in the system is at most twice a number of logical qubits;
performing an adiabatic interpolation of the Hamiltonian of the system from the first Hamiltonian to a second Hamiltonian adiabatically, by adjusting a coupling strength of the coupling mechanism from zero to a non-zero value using the second control signal; and
performing an adiabatic interpolation of the Hamiltonian of the system from the second Hamiltonian to a third Hamiltonian.

17. The method of claim 16, wherein performing an adiabatic interpolation of the Hamiltonian of the system from the second Hamiltonian to the third Hamiltonian comprises adjusting the coupling strength of the coupling mechanism from the non-zero value to zero.

18. The method of claim 16, wherein applying the first control signal to the system comprises applying the first control signal to the system such that the energy level of a first X eigenstate of the second physical qubit is increased relative to an energy level of a second X eigenstate of the second physical qubit.

19. A method for performing a quantum gate comprising:
preparing each of a first physical qubit and a second physical qubit of a plurality of physical qubits coupled by at least one coupling mechanism, such that each coupling mechanism couples at most two of the plurality of physical qubits, in a ground state associated with a first Hamiltonian of a system comprising a plurality of logical qubits formed from the plurality of physical qubits and the at least one coupling mechanism such that a number of physical qubits in the system is at most twice a number of logical qubits;
applying a first control signal to the system such that the energy level of a first X eigenstate of the second physical qubit is increased relative to an energy level of a second X eigenstate of the second physical qubit;
performing a first adiabatic interpolation of the Hamiltonian of the system, such that the first control signal is ramped down to change the strength of the first Hamiltonian from non-zero to zero while a second control signal is ramped up to change the coupling strength of the coupling mechanism from zero to a non-zero value; and performing a second adiabatic interpolation of the Hamiltonian of the system such that the energy level of a first eigenstate of one of the first and second physical qubits along a defined axis of the Bloch sphere is increased relative to an energy level of a second eigenstate of the one of the first and second physical qubits while the coupling strength of the coupling mechanism is returned to zero.

* * * * *